Sept. 1, 1964  A. J. OTTEN  3,146,570
GUARD FINGER AND LEDGER PLATE ASSEMBLY
Filed Nov. 19, 1962

INVENTOR.
ALEX J. OTTEN
BY
RICHEY, McNENNY & FARRINGTON
ATTORNEYS

United States Patent Office 3,146,570
Patented Sept. 1, 1964

3,146,570
GUARD FINGER AND LEDGER PLATE
ASSEMBLY
Alex J. Otten, Peoria, Ill., assignor to R. Herschel Manufacturing Co., Peoria, Ill., a corporation of Illinois
Filed Nov. 19, 1962, Ser. No. 238,692
2 Claims. (Cl. 56—311)

This invention relates to a new and improved guard finger and ledger plate assembly suitable for use on high speed power driven mowing machines.

It is an important object of this invention to provide a novel and improved guard finger and ledger plate assembly wherein the ledger plate is installed on or removed from the guard finger by driving a wedge into or out of its installed position.

It is another important object of this invention to provide a novel and improved guard finger and ledger plate assembly having a locking wedge installable or removable with any impacting type tool such as a hammer.

It is another important object of this invention to provide a novel and improved guard finger and ledger plate assembly wherein a locking wedge is used to positively lock the ledger plate in its installed position preventing vibration or movement of the ledger plate relative to the guard finger even under severe high speed vibration conditions.

It is still another object of this invention to provide a novel and improved guard finger and ledger plate assembly wherein the ledger plate is securely mounted on the guard finger and fixed against movement relative thereto by a locking wedge driven into its installed position from the upper side of the guard finger and removable by driving the wedge up from the under side of the guard finger. It is still another object of this invention to provide a novel and improved guard finger and ledger plate assembly wherein a wedge cooperates with interengaging surfaces formed on the ledger plate and guard finger to securely lock the ledger plate in the installed position. The wedge and wedge opening are proportioned to compensate for variations in tolerances of the various elements and insure secure mounting even when the ledger plate and guard finger vary slightly in dimensions due to manufacturing tolerances.

Further objects and advantages will appear from the following description and drawings, wherein.

Figure 1:
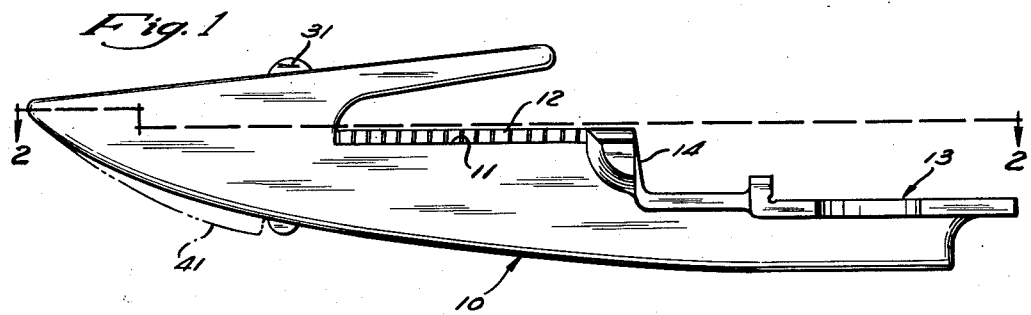
FIGURE 1 is a side elevation of a guard finger and ledger plate assembly incorporating this invention.

A guard finger ledger plate assembly incorporating this invention provides a positive mechanical lock to rigidly secure the ledger plate against movement, thus eliminating unnecessary wear. This guard finger ledger plate assembly utilizes a wedge having a locking taper to secure the ledger plate on the guard finger, wherein the wedge is installed or removed by any impact type tool, such as a hammer. However, if necessary, a wrench or even a rock can be used to drive the wedge either into the installed position or out of the installed position.

Referring to the drawings, the guard finger 10 is preferably formed as a unitary casting having a seat 11 for a ledger plate 12. The rearward end 13 of the guard finger 10 is shaped to permit the finger to be mounted on a mowing machine. A wall 14 forms the rearward portion of a cavity 16 (best illustrated in FIGURE 3) which extends forward to an axial opening 17.

Figure 2:
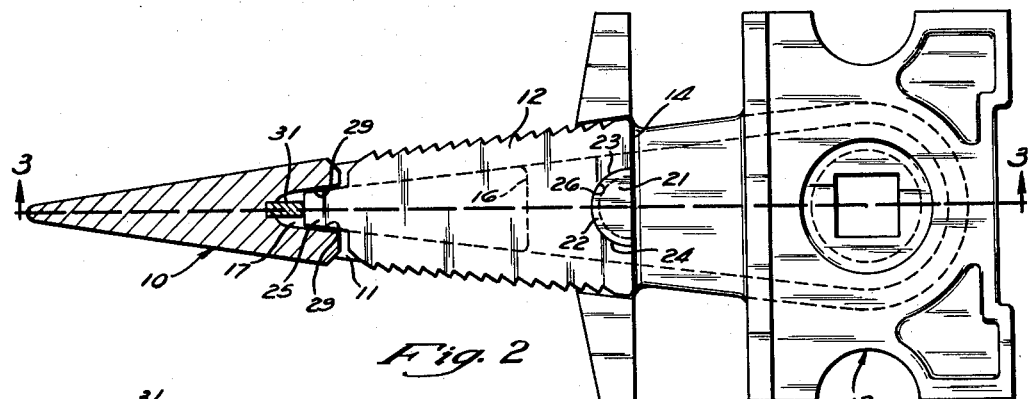
FIGURE 2 is a plan view partially in section taken along the line 2—2 of FIGURE 1.
Figure 3:
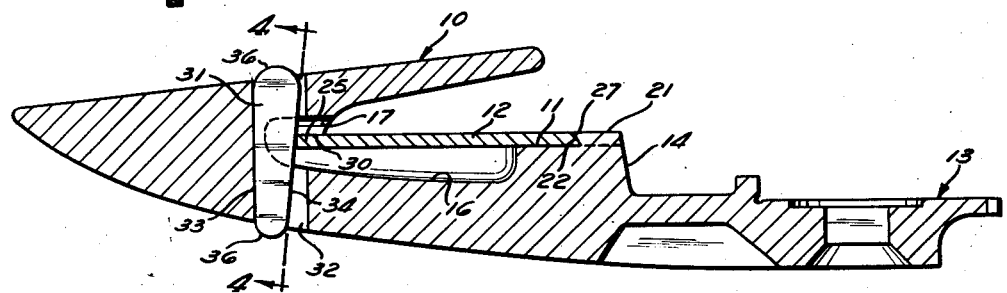
FIGURE 3 is a side elevation in longitudinal section taken along the line 3—3 of FIGURE 2.

The wall 14 is formed with a projection 21 having a semi-circular shape as best illustrated in FIGURE 2, and formed with an underbeveled conical wall 22 as best illustrated in FIGURE 3. The underbeveled wall 22 being conical in shape provides axially extending portions 23 and 24 which are opposed to each other.

The ledger plate 12 is formed with a semi-circular, curved notch 26 having a beveled wall 27 complementary to the underbeveled wall 22 and proportioned in engagement therewith. The portions of the beveled wall 27 extending back along the axially extending portions 23 and 24 prevent lateral movement of the rearward end of the ledger plate relative to the guard finger and the underbeveled relationship between the walls 22 and 27 prevents movement of the rearward end of the ledger plate in a direction upward or away from the seat 11. The forward portion of the underbeveled wall 22 engages the beveled wall 27 and prevents rearward movement of the ledger plate beyond the illustrated installed position.

Figure 4:
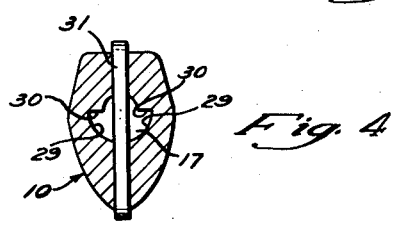
FIGURE 4 is a cross-section taken along the line 4—4 of FIGURE 3.

The forward end of the ledger plate 12 is formed with a projection 25 extending into the opening 17. Lateral movement between the forward end of the ledger plate 12 and the guard finger 10 is prevented by engagement of the sides of the projection 25 with the side wall 29 of the opening 17. The opening 17 is formed, as illustrated in FIGURE 4, with a lateral wall 30 parallel to and facing the seat 11. The lateral wall is spaced from the plane of the seat 11 by a distance substantially equal to the thickness of the ledger plate 12. The upper surface of the projection 25 engages the lateral wall to prevent movement of the forward end of the ledger plate away from the seat. Therefore, the various interengaging surfaces on the ledger plate 12 and guard finger 10 cooperate to securely position the ledger plate 12 in its installed position against the seat 11 so long as the ledger plate is maintained in the rearward position illustrated in the drawings.

To lock the ledger plate in the rearward installed position wherein the walls 22 and 27 are maintained in tight engagement, a wedge 31 is used. The guard finger 10 is formed with a vertical opening 32 having a lateral width slightly larger than to the width of the wedge 31 and an axial length slightly less than the maximum height of the wedge 31. The wedge 31 is formed with opposed wedging surfaces 33 and 34 which converge in a downward direction with a locking angle. The ends of the wedge 31 are rounded at 36 so that the projecting ends will not snag grass or other material. The forward end of the ledger plate extends into the wedge opening to a distance spaced from the forward wall thereof equal to about one half of the sum of the maximum and minimum wedge width. This insures that the wedge will firmly lock the ledger plate even if dimensions vary within the manufacturing tolerances of the assembly.

The various elements are proportioned so that when the wedge is driven downward, with respect to the guard finger 10, to the position illustrated in FIGURE 3, the ledger plate 12 is tightly pressed backward into the installed position wherein the walls 22 and 27 tightly engage. The wedge 31 is also proportioned so that its lower end projects below the lower surface of the guard finger and its upper end projects above the upper surface. Therefore, it is a simple matter to drive the wedge into its installed position by hammering the upper end until the ledger plate is tightly locked into position. To remove the wedge, it is merely necessary to hammer against the lower end to drive the wedge out of its installed position.

To install the ledger plate 12, it is merely necessary to move the projection 25 into the opening 17 until the wall 27 clears the underbeveled wall 22 on the projection 21. When this occurs, the ledger plate 12 is forward of its installed position and the ledger plate 12 can drop down onto the seat. The ledger plate 12 is then pushed backward into the installed position and the wedge 31 is driven into the guard finger to lock the ledger plate 12 in place. The locking taper of the wedge prevents movement of the ledger plate relative to the guard finger under vibration conditions and also prevents the wedge from dropping out of its installed position. Also since the wedge is installed from the upper side, gravity prevents it from falling out if it becomes loose.

In FIGURE 1 a modified form of guard finger is shown by the phantom line 41 which illustrates how the forward end of the finger may be enlarged to extend down at least even with the bottom edge of the wedge 31. This enlarged portion prevents rocks or the likes from hitting and loosening the wedge 31 during operation while still permitting the hammering of the wedge to remove it for replacement of the ledger plate.

Although preferred embodiments of this invention are illustrated, it is to be understood that various modifications and rearrangements of parts may be resorted to without departing from the scope of the invention as defined in the following claims.

What is claimed is:

1. In a device of the character described, an elongated guard finger having an axis and formed with a ledger plate seat, a ledger plate removably mounted on said seat, first complemental wall means formed on one end of said seat and ledger plate interengageable by movement along said axis in a first direction operable when interengaged to prevent relative movement between said one end of said ledger plate in said guard finger in all directions other than a direction opposite said first direction, second complemental walls formed in the other end of said ledger plate and seat interengageable to prevent any substantial lateral and normal movement of said other end of said ledger plate relative to said seat in all directions while permitting only axial movement of said ledger plate relative to said seat, a wedge opening through said guard finger normal to said axis of the guard finger adjacent said other end of said seat, said wedge opening having first and second opposed walls spaced apart at all points along said axis by a minimum first predetermined distance, said wedge opening having parallel side wall portions extending parallel to said axis between said first and second opposed walls, and a wedge in said wedge opening formed with a locking taper having a first and maximum width along the axis of said guard finger less than said first predetermined distance and a second width along said axis less than said first width, said wedge having parallel sides adapted to be guided by said side wall portions of said wedge opening to limit lateral movement of said wedge while allowing said wedge normally to pass freely through said wedge opening from end to end, said other end of said ledger plate projecting past said first wall to a position spaced from said second wall a distance substantially equal to one half the sum of said first width and said second width, said wedge engaging said second wall and said other end of said ledger plate and pressing said ledger plat in said first direction maintaining said first complemental wall means in interengagement and locking said ledger plate and said wedge in said guard finger.

2. A device as defined in claim 1 comprising a guard finger and ledger plate wherein said first complemental wall means are semi-circular and are located at the rearward end of said seat.

References Cited in the file of this patent
UNITED STATES PATENTS

| | | |
|---|---|---|
| 1,735,322 | Kucha | Nov. 12, 1929 |
| 1,810,081 | Kucha | June 16, 1931 |
| 2,148,186 | Buck | Feb. 21, 1939 |
| 2,953,890 | Vik | Sept. 27, 1960 |